(12) United States Patent
Okumura et al.

(10) Patent No.: US 6,771,576 B2
(45) Date of Patent: Aug. 3, 2004

(54) OPTICAL REPRODUCTION APPARATUS

(75) Inventors: Tetsuya Okumura, Neyagawa (JP); Shigemi Maeda, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 650 days.

(21) Appl. No.: 09/833,405

(22) Filed: Apr. 11, 2001

(65) Prior Publication Data

US 2002/0031066 A1 Mar. 14, 2002

(30) Foreign Application Priority Data

Apr. 14, 2000 (JP) ........................................ 2000-112980

(51) Int. Cl.[7] .................................................. G11B 7/00
(52) U.S. Cl. ................ 369/47.25; 369/47.5; 369/53.26; 369/59.15; 369/116
(58) Field of Search ........................... 369/44.31, 44.35, 369/44.36, 47.25, 47.5, 47.53, 53.26, 53.27, 59.11, 59.15, 110, 116, 59.12

(56) References Cited

U.S. PATENT DOCUMENTS

| 5,107,473 A | | 4/1992 | Fuji et al. | |
|---|---|---|---|---|
| 5,617,400 A | * | 4/1997 | Fuji | 369/47.5 |
| 6,144,628 A | * | 11/2000 | Matsuura | 369/47.5 |
| 6,288,992 B1 | * | 9/2001 | Okumura et al. | 369/116 |
| 6,584,050 B1 | * | 6/2003 | Okumura et al. | 369/47.5 |

FOREIGN PATENT DOCUMENTS

| JP | 58-073022 | 5/1983 |
|---|---|---|
| JP | 08-063817 | 3/1996 |
| JP | 2100-099945 | 4/2000 |

* cited by examiner

*Primary Examiner*—Thang V. Tran
*Assistant Examiner*—Noach Vuong
(74) *Attorney, Agent, or Firm*—David G. Conlin; William J. Daley, Jr.; Edwards & Angell, LLP (57) ABSTRACT

An optical reproduction apparatus in accordance with the present invention has a gain control circuit for controlling a gain of an amplifier circuit which amplifies a reproduction signal in accordance with amplitudes of the reproduction signal from an optical recording medium. The amplitude is sent to a power control calculation circuit which controls the reproduction power of a light beam in accordance with the amplitude. The gain control circuit has a slower response speed than that of the power control circuit at least during a period when the power control circuit controls the reproduction power. This allows to provide an optical reproduction apparatus that can realize the stable reproduction power and automatic gain control even to the unevenness of the amplitudes of the reproduction signal.

26 Claims, 11 Drawing Sheets

OPTICAL REPRODUCTION APPARATUS

FIELD OF THE INVENTION

The present invention relates to an optical reproduction apparatus which carries out the reproduction with respect to an optical recording medium, especially relates to an optical reproduction apparatus that simultaneously carries out (a) an AGC (automatic gain control) in which the gain of an amplifier circuit that amplifies a reproduction signal is controlled and (b) a control of the reproduction power of a light beam.

BACKGROUND OF THE INVENTION

In an optical disk reproduction apparatus, a reproduction signal detected by an optical pickup is processed such as amplified and wave-form-equalized by a wave form process circuit. The reproduction signal thus processed is sent to a binary circuit or a PRML process circuit so as to be converted into a digital signal. The amplitude of the reproduction signal varies due to the change such as the change in the reflectance of a recording layer. For this problem, in the wave form process circuit, so called an AGC (automatic gain control) is generally carried out so as to stably amplify the reproduction signal and have a predetermined amplitude (see, for example, Japanese unexamined patent publication No. 58-73022 (publication data: May 2, 1983).

Figure 8:
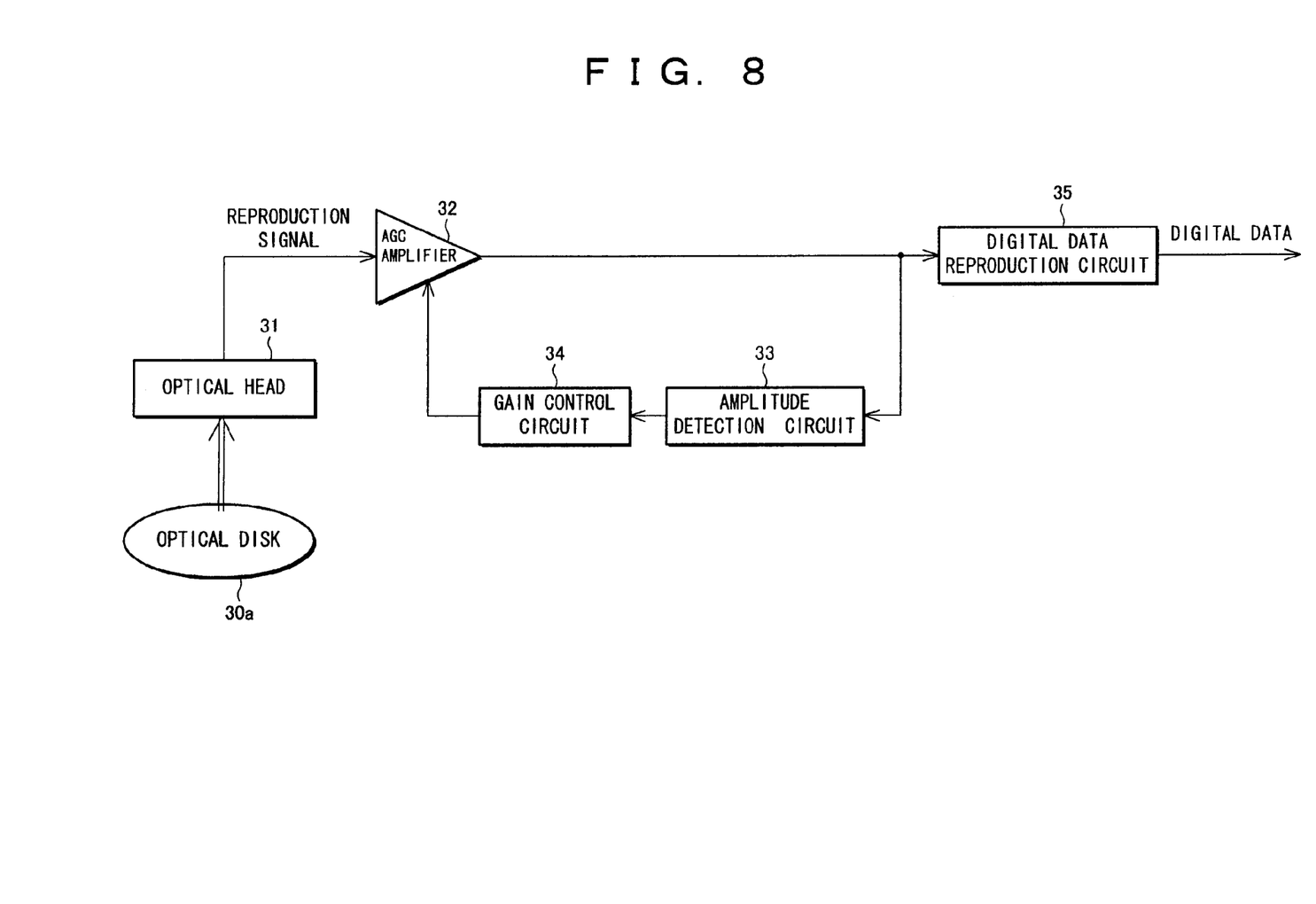
FIG. 8 is an explanatory diagram showing a structure of a conventional optical reproduction apparatus that carries out the automatic gain control.

FIG. 8 is a diagram showing a structure of a conventional optical reproduction apparatus. The following description deals with the operation of such a conventional apparatus. A reproduction signal read out from an optical disk 30a by an optical head 31 is sent to an AGC amplifier 32 so as to be amplified, and then is sent to an amplitude detection circuit 33. The amplitude of the reproduction signal outputted from the amplitude detection circuit 33 is sent to a gain control circuit 34 which compares the amplitude with a reference amplitude, calculates a gain by which the amplitude of the reproduction signal is made to be equal to the reference amplitude, and returns to the AGC amplifier 32. The reproduction signal thus amplified by the AGC amplifier 32, that has a stable predetermined amplitude, is sent to a digital data reproduction circuit 35. This allows to realize a reproduction of the digital data with high reliance and small reading error. The response speed of the amplifier 32 is usually set to be high so as to swiftly follow the change in the amplitudes of the reproduction signal.

Figure 9:
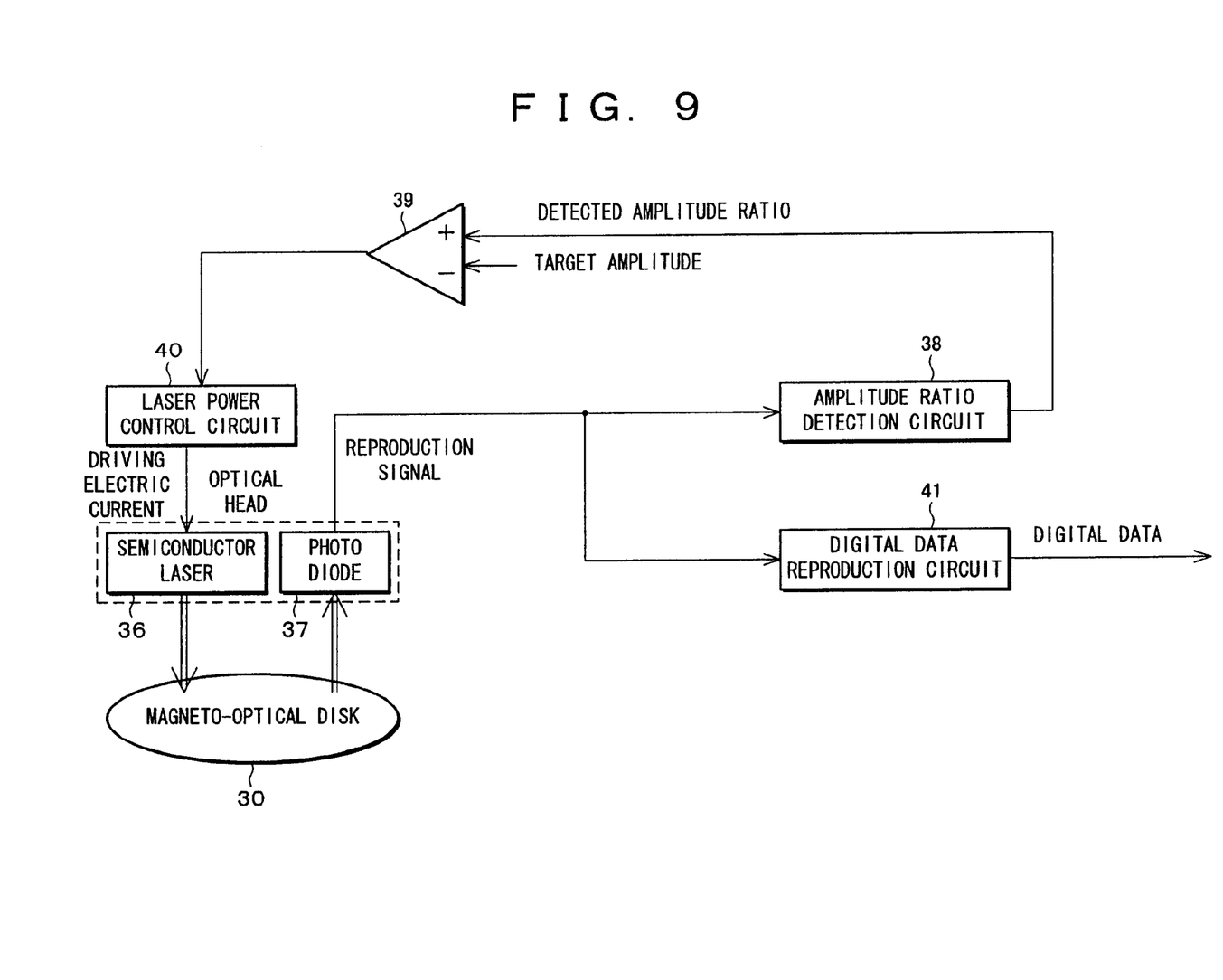
FIG. 9 is an explanatory diagram showing a structure of a conventional magneto-optical disk reproduction apparatus that carries out the reproduction power control.
Figure 10:
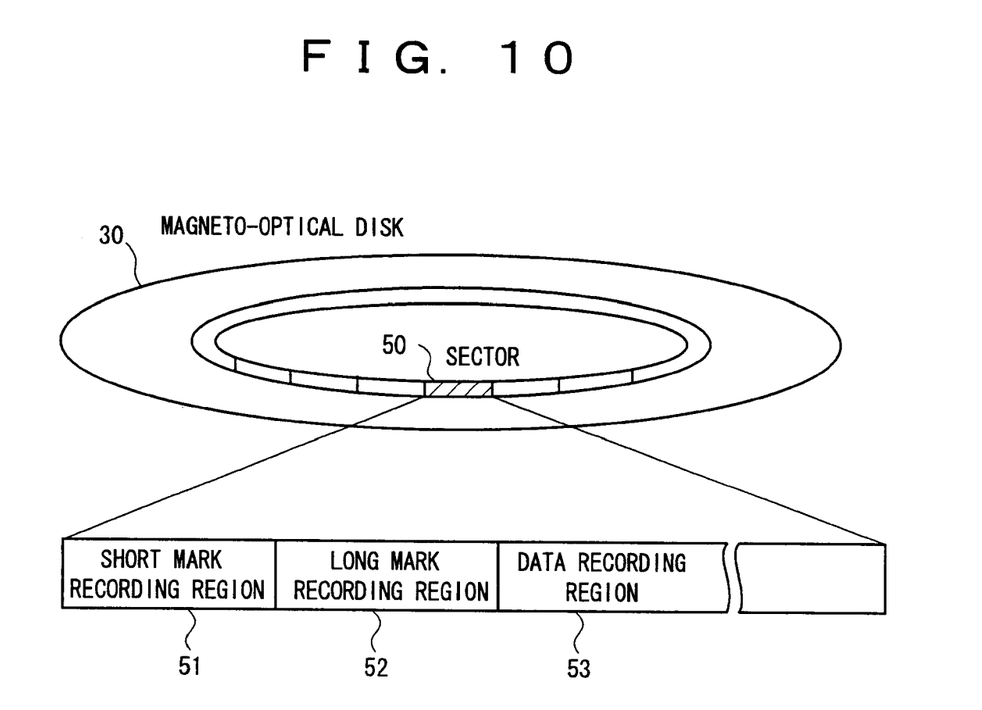
FIG. 10 is a view illustrating a sector structure of the magneto-optical disk shown in FIG. 9.

In the mean time, according to a conventional rewritable magneto-optical disk reproduction apparatus of magnetic super-resolution type, two kinds of marks having respective different lengths are reproduced. The reproduction power is controlled so that the ratio of the two reproduction signals becomes close to a predetermined value, thereby ensuring that the reproduction power is always maintained optimal and the reading error is reduced (see, for example, Japanese unexamined patent publication No. 8-63817 (publication date: Mar. 8, 1996). FIG. 9 is a schematic diagram showing a structure of such a conventional rewritable magneto-optical disk reproduction apparatus. FIG. 10 is an explanatory view illustrating a structure of the magneto-optical disk 30. In FIG. 10, a sector 50 is composed of a short mark recording region 51 and a long mark recording region 52 that are provided for controlling the reproduction power, and a data recording region 53. A pattern in which short marks are repeated is recorded in the short mark recording region 51. A pattern in which long marks are repeated is recorded in the long mark recording region 52. Digital data are recorded in the data recording region 53.

In FIG. 9, the light projected from a semiconductor laser 36 is converged onto the sector 50. When the light is converged onto the short mark recording region 51, the light reflected from the pattern in which the short marks are repeated is directed to a photo diode 37 by which the reflected light is converted to a reproduction signal. In a similar manner, the reproduction signal of the pattern in which the long marks are repeated is reproduced from the long mark recording region 52. The reproduction signals are sent to an amplitude ratio detection circuit 38. The amplitude ratio detected by the amplitude ratio detection circuit 38 and a target amplitude ratio are compared with each other by a differential amplifier 39. And, a feedback control is made, i.e., a laser power control circuit 40 controls a driving electric current of the semiconductor laser 36 so that the difference between the above ratios becomes small. Thus, the driving electric current of the laser light is controlled so that the optimal reproduction power is provided. Thereafter, the projected light is converged onto the data recording region 53. The reproduction signal read out from the data recording region 53 is sent to a digital data reproduction circuit 41 which reproduces the digital data having a low error rate. Thereafter, when converging the projected light onto the next sector, the processing is repeated in a similar manner so that an optimal reproduction power is newly set. Thus, the recording regions for the marks of a reproduction power control use are provided in a dispersion manner, and the amount of the reproduction signal is detected for each sector so as to control the reproduction power. This allows to control the reproduction power in a short time interval and to follow the change in the optimal reproduction power in a short time.

By the way, in the reproduction power control, the error is generated in the process of the detection of the amplitude ratio. More specifically, even when reproducing the mark pattern of the reproduction power control use under the same reproduction power and the same conditions, generated is the unevenness of the amplitude ratio that is reproduced by the noise contained in the reproduction signal. This causes the error in the differential signal of the detected amplitude ratio and the target amplitude ratio. The error is generated in the reproduction power to be controlled, accordingly. Even when the reproduction is made under the same conditions, since the reproduction power to be controlled has the unevenness due to the error. The amplitudes of the reproduction signal have also the unevenness, accordingly. For example, in the case where the reproduction power is controlled for each sector like the reproduction apparatus shown in FIG. 9, the reproduction conditions should be almost the same among the adjoining sectors. However, in actual, the amplitudes of the reproduction signals obtained for each sector have the unevenness due to the abovementioned reason. Note that the amount of the unevenness is not so large. The error rate in the digital data reproduction is little affected.

However, in the case where the reproduction power control and the AGC are simultaneously carried out, when the response speed of the AGC is so fast as to carry out the AGC for each sector, as has been discussed, the gain of the AGC is found in accordance with the amplitude that varies depending on the unevenness of the reproduction power. This causes the problem that the unevenness of the amplitudes becomes larger so as to adversely affect the digital data reproduction.

Figure 11:
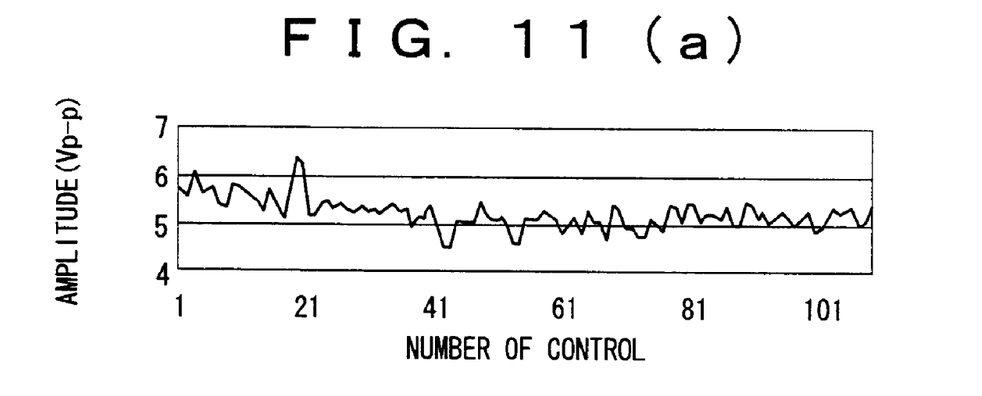
FIG. 11(a) is an explanatory view showing how the amplitude changes when only the reproduction power control is carried out.
FIG. 11(b) is an explanatory view showing how the amplitude changes when the reproduction power control and the automatic gain control are simultaneously carried out.

FIG. 11 shows the results of the change in the amplitudes of the long mark that has actually been measured when controlling the reproduction power for a single sector under a constant condition. The horizontal axis indicates how many times the controlling has been carried out (how long the time has passed). The vertical axis indicates the amplitudes of the reproduction signal of the long mark. FIG. 11(a) shows the change in the amplitudes when only the reproduction power control is carried out. FIG. 11(b) shows the change in the amplitudes when the reproduction power control and the AGC for each sector are simultaneously carried out. As is clear from FIGS. 11(a) and 11(b), when the reproduction power control and the AGC for each sector are simultaneously carried out, the unevenness of the amplitudes became large. When comparing the both cases in accordance with the standard deviation (σ), the standard deviations are 13 percent for the result shown in FIG. 11(a) while 22 percent (becoming worse) for the result shown in FIG. 11(b).

Note that since it is not possible without the AGC to follow the amplitude when the reflectance of the recording layer changes, for example, the problem still remains that the error rate deteriorates for the digital data reproduction.

SUMMARY OF THE INVENTION

It is an object of the present invention to provide an optical reproduction apparatus in which the reproduction power control of a light beam and the automatic gain control are simultaneously carried out.

In order to achieve the foregoing object, an optical reproduction apparatus in accordance with the present invention is characterized by being provided with (a) gain control means for controlling a gain of an amplifier circuit that amplifies a reproduction signal from an optical recording medium in accordance with amplitudes of the reproduction signal, and (b) power control means for controlling reproduction power of the light beam in accordance with the amplitude, wherein the gain control means has a slower response speed than that of the power control means at least during a period when the power control means controls the reproduction power.

With the arrangement, the AGC gain does not follow the change in the amplitudes due to the control error of the reproduction power, but can only follow the change in the amplitudes whose time constant is great due to the difference of recording conditions or other reasons.

By averaging the amplitudes from which the gain of the AGC is found and using an averaged amplitude, the gain of the AGC does not locally follow the change in the amplitudes, but can only follow the change in the amplitudes whose time constant is great due to the difference of recording conditions or other reasons.

Further, since the gain having little error is found in accordance with an averaged amplitude that is obtained by averaging only the amplitudes detected normally, it is possible to realize an AGC with high accuracy.

In addition, when (a) monitoring how the reproduction power controls, and (b) switching to the slower response speed of the AGC during a period when the reproduction power is controlled while (c) switching to the higher response speed of the AGC during a period when the reproduction power is not controlled, it is possible to realize an AGC that are suitable for respective cases with high accuracy.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. The present invention will become more fully understood from the detailed description given hereinbelow and the accompanying drawings which are given by way of illustration only, and thus, are not limitative of the present invention.

DESCRIPTION OF THE EMBODIMENTS

Figure 1:
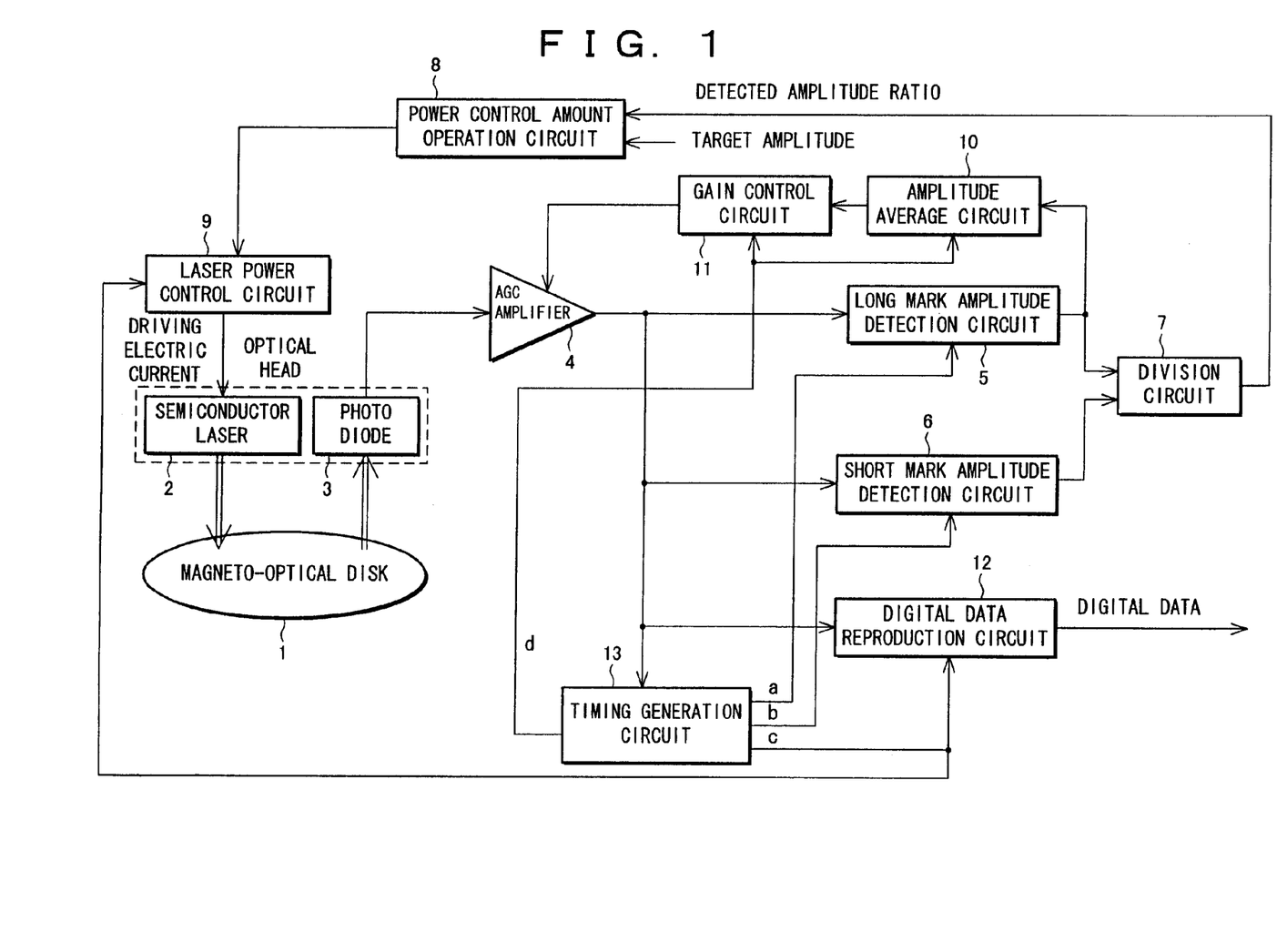
FIG. 1 is an explanatory view showing a structure of an optical reproduction apparatus of the first embodiment in accordance with the present invention.
Figure 2:
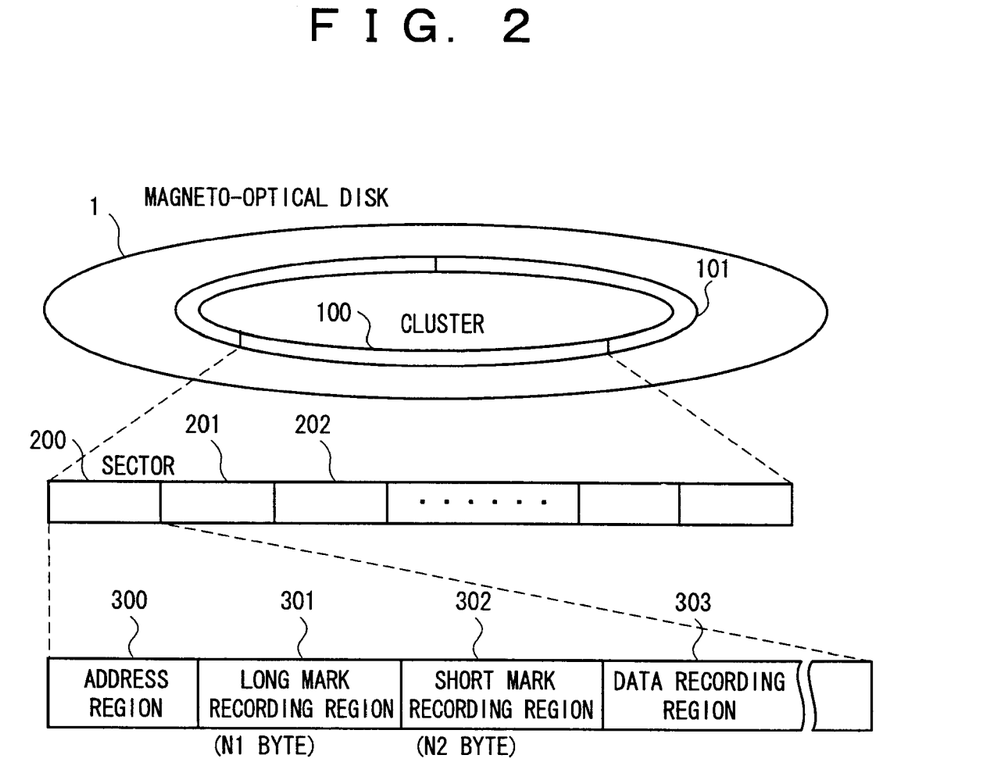
FIG. 2 is a view illustrating cluster structure and sector structure of a magneto-optical disk shown in FIG. 1.

The following description deals with one embodiment of the present invention with reference to drawings. FIG. 1 is an explanatory view showing a structure of the case where the present invention is adapted to a magneto-optical disk reproduction apparatus of magnetic super-resolution type which generates an aperture, having a smaller diameter than a diameter of a light beam spot, in a reproduction layer so as to reproduce the information that has been recorded from a recording layer. FIG. 2 is a view illustrating a structure of a magneto-optical disk 1. As shown in FIG. 2, the magneto-optical disk 1 has clusters 100, 101, . . . , each cluster being a minimum recording unit during recording and reproduction. The cluster 100 has a predetermined number of sectors (200, 201, 202, . . . ). A leading part of the sector 200 is an address region 300. The address region 300 is followed by a long mark recording region 301, a short mark recording region 302, and a data recording region 303 in this order. In the address region 300, provided are a cluster number that indicates the cluster to which the sector 200 belongs and a sector number in the cluster are recorded. The long mark recording region 301 and the short mark recording region 302 are provided for controlling the reproduction power. In the data recording region 303, the information data is recorded. In the long mark recording region 301, recorded is a pattern in which a long mark having a longer length (for example, having a length of 8 T where T indicates a channel bit length) than the diameter of the aperture is repeated, and such a pattern occupies N1-byte. In the short mark recording region 302, recorded is a pattern in which a short mark having a shorter length (for example, having a length of 2 T) than the diameter of the aperture is repeated, and such a pattern occupies N2-byte.

The following description deals with the reproduction operation of the magneto-optical disk reproduction apparatus. In FIG. 1, when the light projected from a semiconductor laser 2 converged onto the address region 300 of the sector 200 on the magneto-optical disk 1, its reflected light is directed to a photo diode 3 in which the incident light is converted to an electric signal. The electric signal is sent to an AGC amplifier 4 which amplifies the electric signal and outputs it as a reproduction signal. Based on the reproduction signal thus obtained from the address region 300, the sector address is identified. Subsequently, when the light projected from the semiconductor laser 2 is converged onto the long mark recording region 301, the light reflected from the pattern in which the long mark is repeated is outputted as a reproduction signal in a similar manner to a long mark amplitude detection circuit 5 which calculates and outputs an amplitude of the long mark. Subsequently, the light is converged onto the short mark recording region 302, and an amplitude of the short mark is outputted from a short mark amplitude detection circuit 6. The amplitudes of the long and short marks are sent to a division circuit 7 in which the ratio of the amplitudes is found and is sent to a power control amount operation circuit 8. The power control amount operation circuit 8 compares the ratio thus found with a target ratio of the amplitudes and calculates the power control amount to be fed back in accordance with the difference between the ratios.

An optimal reproduction power is determined based on the power control amount thus found. A laser power control circuit 9 controls the driving electric current of the semiconductor laser 2 so as to realize the optimal reproduction power in accordance with a timing which is detected by a timing generation circuit 13 when the light is converged onto the leading part of the next sector 201.

As a result, the light, having such an optimal reproduction power, is projected from the semiconductor laser 2 and is converged onto the data recording region 303. The reproduction signal read out from the data recording region 303 is sent to a digital data reproduction circuit 12. The digital data having a low error rate is reproduced, accordingly. Thus, the reproduction power is optimally set for each sector.

In the mean time, the amplitude of the long mark outputted from the long mark amplitude detection circuit 5 is sent to the division circuit 7 for the purpose of the reproduction power control, and is also sent to an amplitude average circuit 10.

The amplitude average circuit 10 averages all the amplitudes of the long mark detected from the respective sectors 200, 201, 202, . . . , in the cluster 100, and outputs it as an average amplitude. A gain control circuit 11 calculates a gain that makes the average amplitude be equal to a predetermined amplitude, and newly sets the AGC amplifier 4 so as to have the gain thus found in accordance with a timing, that is detected by the timing generation circuit 13, in which the light is converged onto the leading part of the next sector 101. Thus, the optimal gain that has been found in accordance with the amplitude detected from the cluster 100 is reflected during the reproduction of the next cluster 101.

Figure 3:
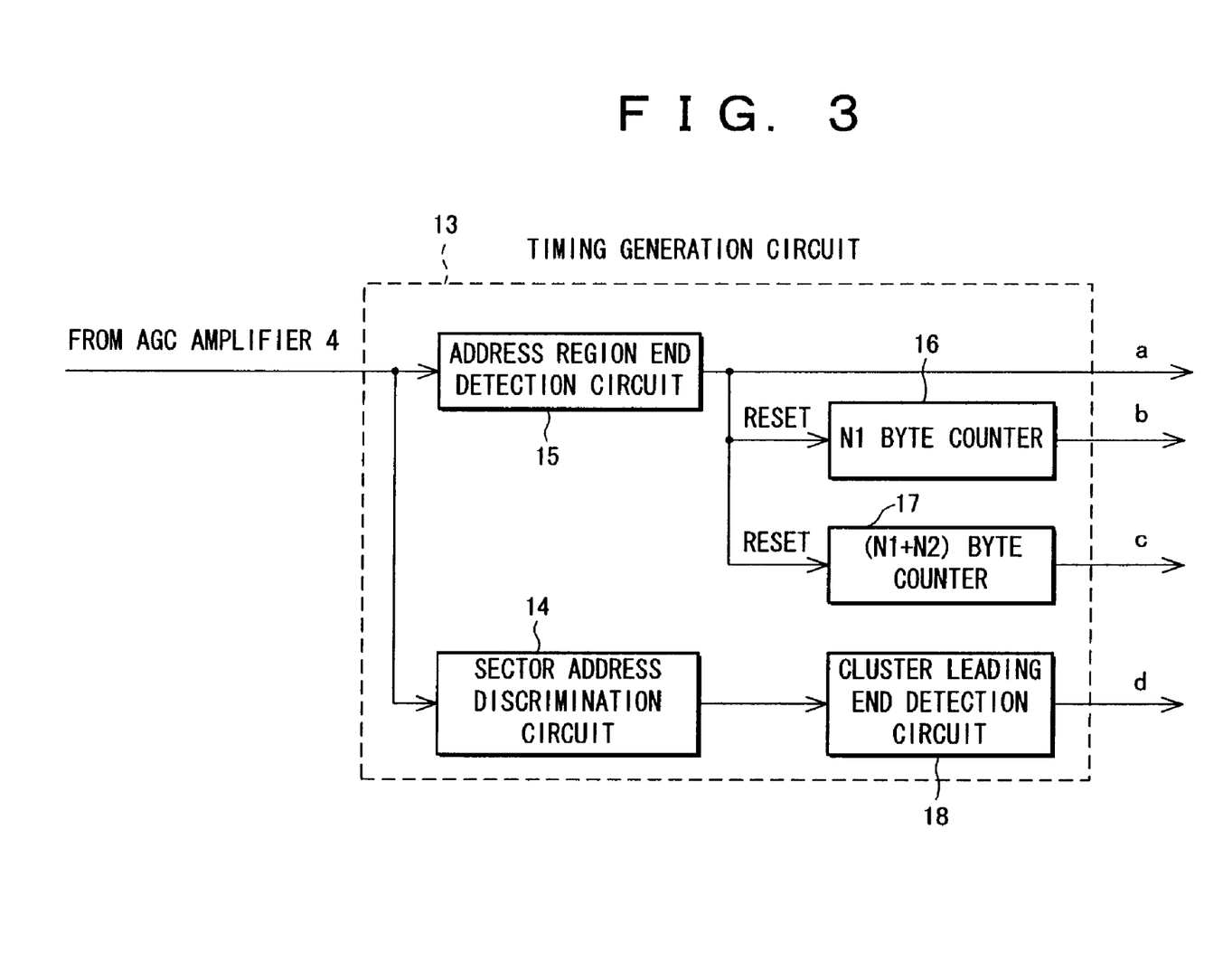
FIG. 3 is a block diagram showing a structure of a timing generation circuit shown in FIG. 1.

The following description deals with the structure and the operation of the timing generation circuit 13 in detail.

FIG. 3 is a block diagram showing a structure of the timing generation circuit 13. A sector address discrimination circuit 14 starts to discriminate the sector address based on the reproduction signal from the address region of the sector that has been sent by the AGC amplifier 4. When the reproduction signal is obtained from the end of the address region 300, an address region end detection circuit 15 outputs a timing signal a to the long mark amplitude detection circuit 5. In accordance with the timing signal a, the long mark amplitude detection circuit 5 starts to calculate the amplitudes of the long mark from the reproduction signal of the pattern in which the long mark is repeated, and calculates the amplitude corresponding to N1-byte. The timing signal a is sent to an N1-byte counter 16 and an (N1+N2)-byte counter 17, respectively.

After finishing the reproduction of the long mark recording region 301, the reproduction signal is obtained from the short mark recording region 302. In response to a timing signal b sent from the N1-byte counter 16, the short mark amplitude detection circuit 6 starts to carry out the operation in which the amplitudes of the short mark are found, and calculates the amplitude corresponding to N2-byte.

Upon finishing the reproduction operation with respect to the short mark recording region 302, a timing signal c is outputted from the (N1+N2)-byte counter 17. In response to the timing signal c, the laser power control circuit 9 sets again the reproduction power to be an optimal power thus newly found. Simultaneously, in response to the timing signal c, the digital data reproduction circuit 12 starts to reproduce the digital data in the data recording region 303.

Thus, the above-mentioned operations are repeatedly carried out for each sector.

In the mean time, a cluster leading end detection circuit 18 detects a leading sector of a cluster in accordance with the address information from the sector address discrimination circuit 14 so as to output a timing signal d. In response to the timing signal d, the gain control circuit 11 sets the gain of the AGC amplifier 4 to be an optimal gain thus newly found. Simultaneously, in response to the timing signal d, the amplitude average circuit 10 is reset and starts to average the amplitudes of the long mark of each sector in the cluster so as to calculate an average amplitude of the next cluster.

As has been described above, in the optical reproduction apparatus of the present embodiment, the reproduction power is set in response to the timing obtained for each sector (first recording unit), and the gain of the AGC amplifier 4 is set in response to the timing obtained for each cluster (second recording unit), the timing obtained for each cluster being slower than the timing obtained for each sector. Namely, it is set so that the response of the controlling of the AGC gain is slower than that of the controlling of the reproduction power. Accordingly, it is possible to follow the change in the optimal reproduction power in a short time, and is also possible for the AGC gain to follow the change in the amplitudes among the clusters which possibly occurs due to the difference of the recording conditions or other reasons, not follow the change in the amplitude due to the control error of the reproduction power.

In addition, the amplitude on which the calculating of the gain of the AGC amplifier 4 is based is found by averaging the amplitudes of the reproduction signal of the long marks recorded for the respective sectors that are provided so as to be dispersed in the cluster. Accordingly, it is possible to realize a stable AGC without being affected by the change in the amplitudes that occurs locally in the cluster.

Figure 4:
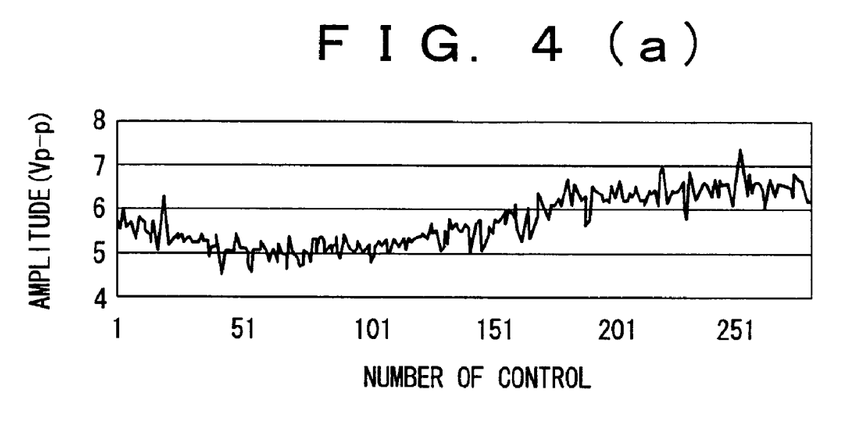
FIG. 4(a) is an explanatory view showing how the amplitude changes when only the reproduction power control is carried out.
FIG. 4(b) is an explanatory view showing how the amplitude changes when the reproduction power control and the automatic gain control are simultaneously carried out.

FIGS. 4(a) and 4(b) show the measured results of the change in the amplitudes of the long marks during the controlling of the reproduction power for each sector under constant conditions in an actual optical disk reproduction power. The horizontal axis and the vertical axis indicate the same dimensions as those of FIG. 11. More specifically, FIG. 4(a) shows the change in the amplitudes when only the reproduction power control is carried out. FIG. 4(b) shows the change in the amplitudes when the reproduction power control and the AGC for each sector are simultaneously carried out. As is clear from FIGS. 4(a) and 4(b), even when the reproduction power control and the AGC for each sector are simultaneously carried out, the unevenness of the amplitudes does not increase. In addition, the change in the amplitude having a great time constant is canceled by the effect of the AGC.

(Second Embodiment)

Figure 5:
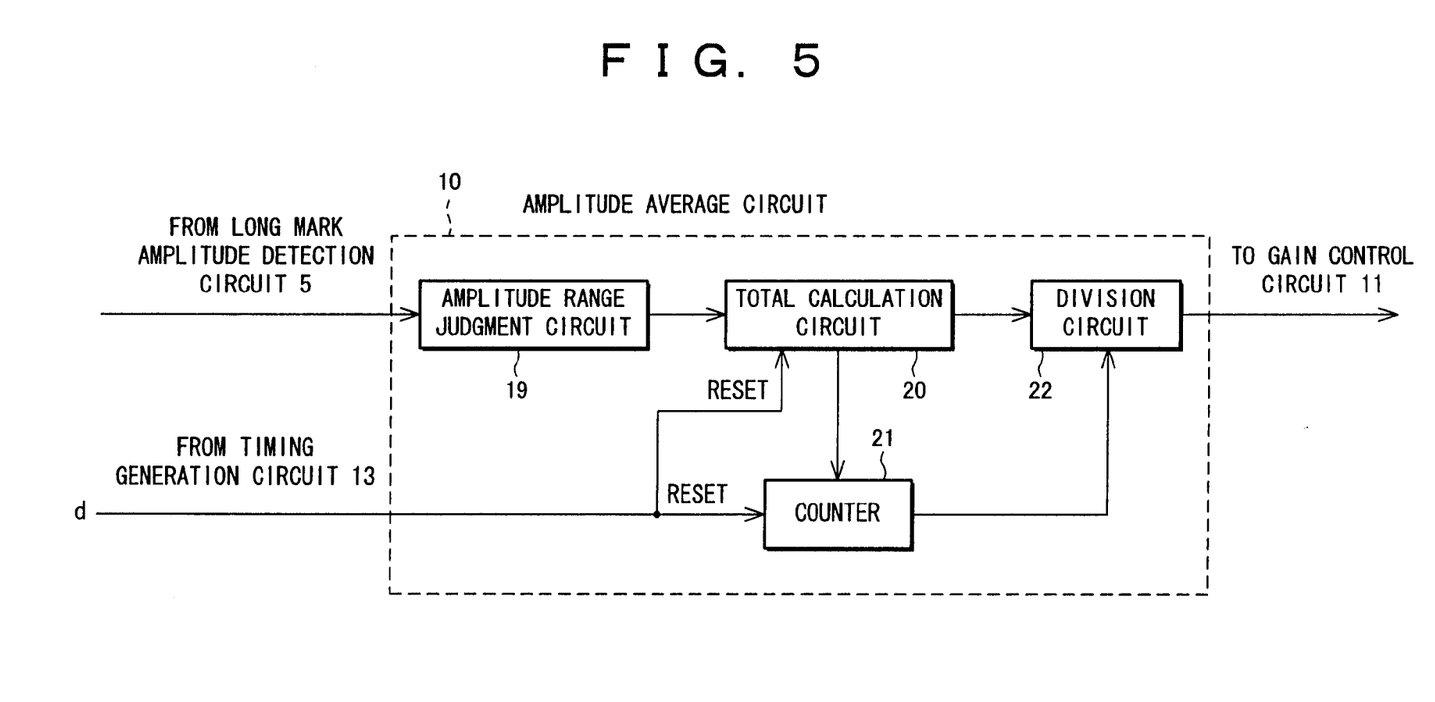
FIG. 5 is a block diagram showing a structure of an amplitude average circuit of the second embodiment in accordance with the present invention.

The following description deals with another embodiment of the present invention with reference to FIG. 5. Note that the description of the same structure as that of the first embodiment is omitted here.

According to the second embodiment, as shown in FIG. 5, the amplitude average circuit 10 is composed of an amplitude range judgment circuit 19, a total calculation circuit 20, a counter 21, and a division circuit 22.

The following description deals with the averaging operations of the amplitudes of the long marks in detail. Firstly, upon receipt of the timing signal d, from the timing generation circuit 13, indicative of the reproduction of the leading sector of a cluster, the total calculation circuit 20 and the counter 21 are reset.

Then, while the respective sectors in the cluster are consecutively reproduced, the amplitudes of the long marks detected from the long mark recording region by the long mark amplitude detection circuit 5 are sent to the amplitude range judgment circuit 19. The amplitude range judgment circuit 19 judges whether or not the amplitudes thus detected fall within a normal range (a predetermined range), and sends them to the division circuit 22, only when it is judged that the amplitudes fall within such a normal range. The total calculation circuit 20 sums up the inputted amplitudes and outputs its sum total. The total calculation circuit 20 outputs a trigger signal to the counter 21 in response to each inputted amplitude. As a result, the counter 21 counts the number of the amplitudes that have been inputted into the total calculation circuit 20, and outputs the number thus counted to the division circuit 22. The division circuit 22 divides the sum total of the amplitudes by the number thus counted so as to output an average amplitude to the gain control circuit 11.

When finishing the reproduction operations of all the sectors of the cluster thus, the amplitude average circuit 10 outputs the result obtained by averaging only the amplitudes that excludes the amplitudes that have been abnormally detected due to the defects or other reasons among the amplitudes of the long marks obtained from the respective sectors in the cluster. Upon receipt of the timing signal d indicative of the reproduction of the leading sector of the next cluster, the gain control circuit 11 determines and sets the gain of the AGC amplifier 4 in accordance with the average amplitude. Simultaneously, the total calculation circuit 20 and the counter 21 are reset again so that the averaging of the amplitudes in a new cluster are started.

The gain of the AGC amplifier 4 determined by the amplitude obtained by averaging only the amplitudes of the long marks that have been normally detected have little error. This allows to realize an AGC with high accuracy.

According to the second embodiment, the judgment whether or not the amplitudes detected are normal is made by judging whether or not the amplitudes of the long marks detected from the respective sectors fall within the predetermined range. The present invention is not limited to this judgment. For example, it may be judged that the abnormal amplitudes are detected, when the amplitude of the current sector is compared with that of its previous sector and the change ratio thus compared between them is extremely great. Of course, this judgment has also the effects of the present invention. The point of the present invention resides in that the averaging is carried out excluding the amplitudes that are regarded as abnormal ones among the amplitudes of the respective sectors in the cluster so as to reduce the AGC error. Accordingly, the means for judging whether or not the amplitude for each sector is normal is not limited to a specified one.

(Third Embodiment)

Figure 6:
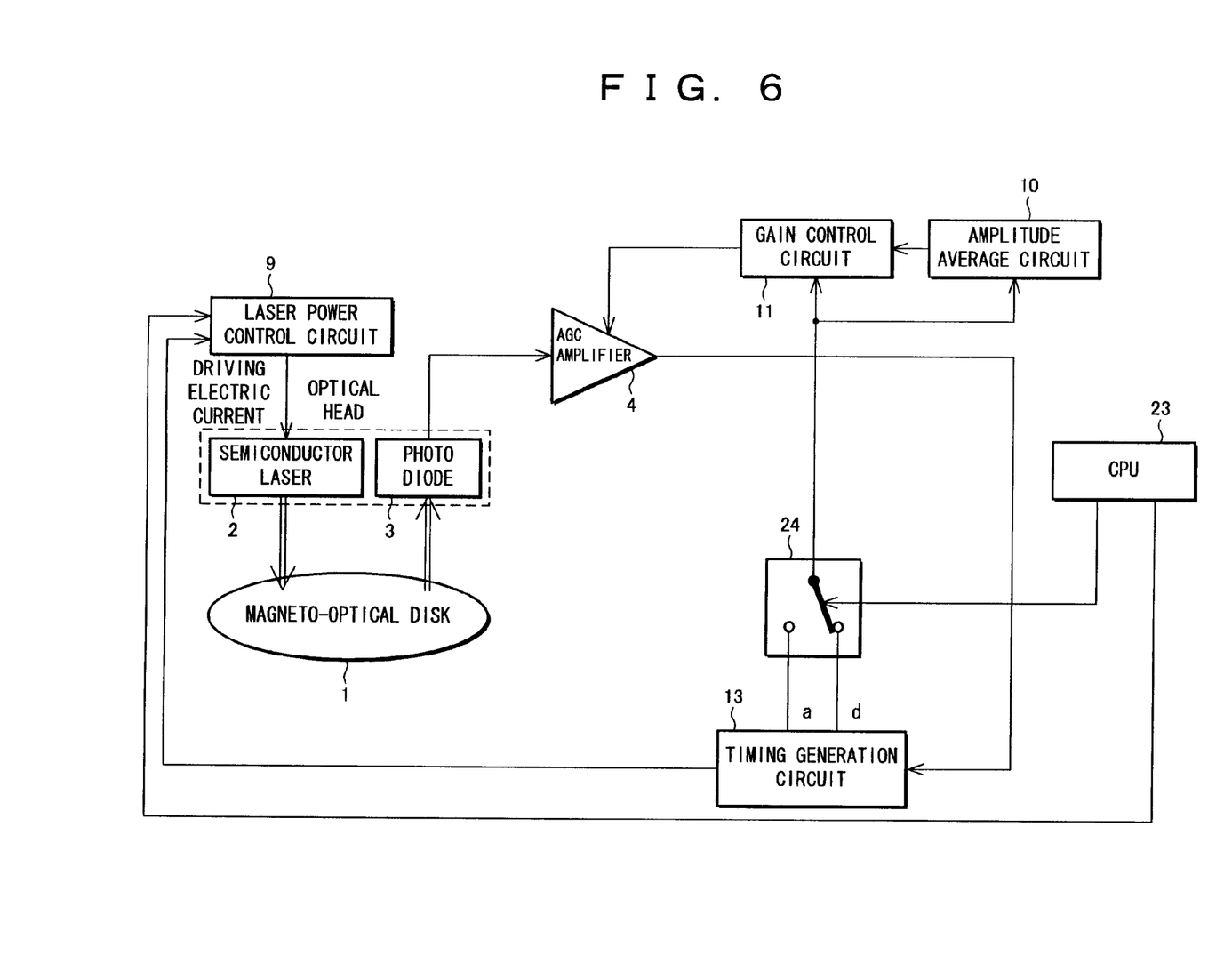
FIG. 6 is an explanatory view showing a structure of an optical reproduction apparatus of the third embodiment in accordance with the present invention.
Figure 7:
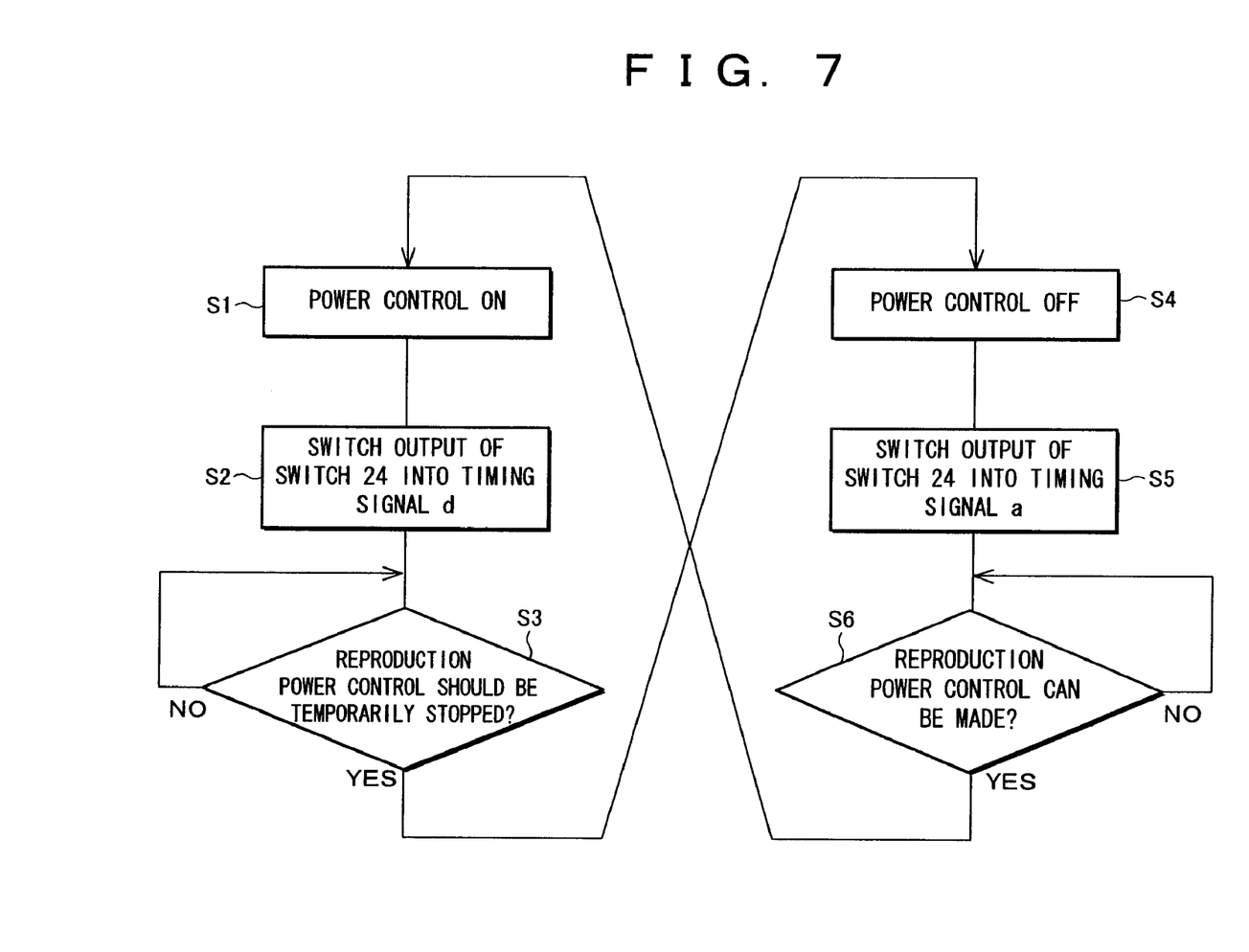
FIG. 7 is a flow chart illustrating the operation of CPU shown in FIG. 6.

The following description deals with a further embodiment of the present invention with reference to FIGS. 6 and 7. Note that the description of the same structure as that of the first or second embodiment is omitted here.

FIG. 6 is an explanatory view showing a structure of an optical reproduction apparatus of the third embodiment in accordance with the present invention. FIG. 7 is a flow chart illustrating the operation of the third embodiment.

According to the present embodiment, in addition to the structure of the first embodiment, a CPU 23 for making on or off the controlling of the reproduction power and controlling of the timing of the AGC, and a switch 24 for switching the timing signal a and the timing signal d outputted from the timing generation circuit 13. The CPU 23 outputs control signals to the respective laser power control circuit 9 and the switch 24.

The following description deals with the operations of an optical reproduction apparatus in accordance with the present embodiment.

According to the optical reproduction apparatus, during a period when the reproduction operations are consecutively carried out, the controlling of the reproduction power is carried out for each sector. In step S3 of FIG. 7, it is always observed whether or not the controlling of the reproduction power temporarily stopped due to the reason such as the starting of the seek operation of an optical head or the tracking-off.

When the necessity occurs to temporarily stop the controlling of the reproduction power, the step S4 is executed and makes the reproduction power off so as to fix the reproduction power. Then, the step S5 is executed so as to switch the output of the switch 24 into the timing a. This allows the reset interval of the amplitude average circuit 10 and the gain control circuit 11 to vary depending on the sector. Accordingly, the response time of the AGC becomes short (i.e., the response speed becomes high) so as to swiftly follow the change in the amplitudes of the reproduction signal. In the step S6, it is checked whether or not the controlling of the reproduction power can be made.

When it is confirmed that the controlling of the reproduction power can be made (for example, in the second embodiment, when the ratio of the normal amplitudes becomes not less than the predetermined amplitude), the step S1 is executed so as to make the reproduction power on, and then the step S2 is executed so as to switch the output of the switch 24 into the timing signal d. This allows the reset interval of the amplitude average circuit 10 and the gain control circuit 11 to vary depending on the cluster. Accordingly, the response time of the AGC becomes longer than that of the controlling of the reproduction power, again.

Thus, according to the present embodiment, it is observed whether the controlling of the reproduction power is carried out or is stopped. When the controlling of the reproduction power is carried, the response time of the AGC is set to be long, while the response time of the AGC is set to be short when the controlling of the reproduction power is stopped. This allows (a) to suppress the unevenness of the amplitudes when the controlling of the reproduction power is carried and (b) to make it easy to reproduce the data that has been recorded without the controlling of the reproduction power by accurately adjusting the amplitudes of the reproduction signal based on the high speed AGC control when the controlling of the reproduction power is stopped. For this reason, for example, even when the conditions, for controlling the reproduction power, of the amplitudes of the reproduction signal are strictly set, the possibility to read out the data that has been recorded prior to satisfying the conditions becomes higher. Accordingly, it is possible to shorten the waiting time required for the amplitudes of the reproduction signal to satisfy the conditions.

The control for switching the response times of the AGC is made by use of the CPU 23 in the third embodiment. Instead, an exclusive circuit may be added for observing how the reproduction power is controlled and the switching the response times of the AGC may be made based on the observed results.

According to the first through third embodiments, the gain control circuit 11 is composed of the AGC amplifier 4, the gain control circuit 11, the amplitude average circuit 10, the timing generation circuit 13, and the long mark amplitude detection circuit 5. The power control means is composed of the long mark amplitude detection circuit 5, the short mark amplitude detection circuit 6, the timing generation circuit 13, the division circuit 7, and the power control amount operation circuit 8. The switching means is composed of the CPU 23 and the switch 24. The judging means is composed of the amplitude range judgment circuit 19. However, the above-mentioned each means is not limited to the above-described one, a variety of modifications may be possible within the scope of the present invention. Each of the schematic structures shown in FIGS. 1, 3, 5, 6, and 7 of the first through third embodiments is only an example. Accordingly, the present invention should not be limited to this.

The first through third embodiments deal with an example of a magneto-optical disk reproduction apparatus. However, the present invention is not limited to this. For example, the present invention may be adapted to a reproduction apparatus for such as an optical disk of a phase transition type. The present invention may be adapted to an apparatus having the function of a reproduction. For example, such an apparatus may be a recording and reproduction apparatus that can carry out the recording and reproduction operations.

According to the first through third embodiments, the timing of the reproduction power control is made for each sector, the timing of the AGC control is made for each cluster. However, the present invention is not limited to this, provided that the response time of the AGC control is longer than that of the reproduction power control, i.e., the AGC control is made for each of the second recording units that is greater than the first recording unit when the reproduction power control is made for each of the first recording units. For example, when the timing of the AGC control is made for each cluster, the timing of the reproduction power control may be made, for example, for every two sectors (for a plurality of sectors less than the sectors that constitutes a cluster).

According to the descriptions that have been described, the AGC control is made by use of the reproduction signal from the long mark pattern. However, the present invention is not limited to this. A reproduction signal from the short mark pattern or other specified mark patter may used. Instead, a reproduction signal from not-specified mark (for example, a reproduction signal from the entire sectors) may be used. Note that the reproduction signal from the specified mark pattern allows to carry out the AGC power control more easily and correctly. When using the long mark pattern, it is possible to obtain a great reproduction signal, thereby ensuring to carry out the AGC control with precision.

The first optical reproduction apparatus of the present invention, as has been described above, is provided with (a) gain control means for controlling a gain of an amplifier circuit which amplifies a reproduction signal in accordance with amplitudes of the reproduction signal from an optical recording medium; and (b) power control means for controlling a reproduction power of a light beam in accordance with the amplitude, and is characterized in that the gain control means has a slower response speed than that of the power control means at least during a period when the power control means controls the reproduction power.

The second optical reproduction apparatus of the present invention, as has been described above, in addition to the first optical reproduction apparatus, is characterized by further having switch means for switching the response speed of the gain control means to be a high speed when the reproduction power control is stopped by the power control means.

The third optical reproduction apparatus of the present invention, as has been described above, is provided with (a) gain control means for controlling a gain of an amplifier circuit which amplifies a reproduction signal in accordance with amplitudes of the reproduction signal from an optical recording medium; and (b) power control means for controlling a reproduction power of a light beam in accordance with the amplitude, and is characterized in that the power control means controls the reproduction power for each of first recording units, and the gain control means controls the gain for each of second recording units that is greater than the first recording unit at least during a period when the power control means controls the reproduction power.

The fourth optical reproduction apparatus of the present invention, as has been described above, in addition to the third optical reproduction apparatus, is characterized by further having switch means for switching so that the gain by the gain control means is controlled for each recording unit that is smaller than the second recording unit.

The fifth optical reproduction apparatus of the present invention, as has been described above, in addition to the third or fourth optical reproduction apparatus, is characterized in that the power control means controls the reproduction power in accordance with an average of amplitudes of the reproduction signal from a specified mark pattern in the first recording unit, and the gain control means controls the gain in accordance with an average of amplitudes of the reproduction signal from a specified mark pattern in the second recording unit.

The sixth optical reproduction apparatus of the present invention, as has been described above, in addition to the fifth optical reproduction apparatus, is characterized in that the recording medium is an optical recording medium of super-resolution type that generates in a reproduction layer an aperture which is smaller than a diameter of a light beam spot so as to reproduce recorded information from a recording layer, the power control means controls the reproduction power in accordance with an average of the amplitudes of the reproduction signal from the specified mark pattern composed of a long mark pattern and a short mark pattern, and the gain control means controls the gain in accordance with an average of the amplitudes that have been detected from the reproduction signal of the long mark pattern.

The seventh optical reproduction apparatus of the present invention, as has been described above, in addition to the fifth or sixth optical reproduction apparatus, is characterized in that the gain control means includes judgment means for ensuring to average the amplitudes that excludes amplitudes that are abnormal among the amplitudes of the reproduction signal.

The eighth optical reproduction apparatus of the present invention, as has been described above, in addition to any one of the fifth or sixth optical reproduction apparatus, is characterized in that the first recording unit is composed of one or more sectors and the second recording unit is composed of a cluster that is constituted by a plurality of sectors and is a minimum recording unit during recording and reproduction.

With the arrangement, the AGC gain does not follow the change in the amplitudes due to the control error of the reproduction power, but can only follow the change in the amplitudes whose time constant is great due to the difference of recording conditions or other reasons.

By averaging the amplitudes from which the gain of the AGC is found and using an averaged amplitude, the gain of the AGC does not locally follow the change in the amplitudes, but can only follow the change in the amplitudes whose time constant is great due to the difference of recording conditions or other reasons.

Further, since the gain having little error is found in accordance with an averaged amplitude that is obtained by averaging only the amplitudes detected normally, it is possible to realize an AGC with high accuracy.

In addition, since (a) monitoring how the reproduction power controls, and (b) switching to the slower response speed of the AGC during a period when the reproduction power is controlled while (c) switching to the higher response speed of the AGC during a period when the reproduction power is not controlled, it is possible to realize an AGC that are suitable for respective cases with high accuracy.

There are described above novel features which the skilled man will appreciate give rise to advantages. These are each independent aspects of the invention to be covered by the present application, irrespective of whether or not they are included within the scope of the following claims.

What is claimed is:

1. An optical reproduction apparatus, comprising:
   gain control means for controlling a gain of an amplifier circuit which amplifies a reproduction signal in accordance with amplitudes of the reproduction signal from an optical recording medium; and
   power control means for controlling a reproduction power of a light beam in accordance with the amplitude,
   wherein the gain control means has a slower response speed than that of the power control means at least during a period when the power control means controls the reproduction power.

2. The optical reproduction apparatus as set forth in claim 1, further comprising switch means for switching the response speed of the gain control means to be a high speed when the reproduction power control is stopped by the power control means.

3. An optical reproduction apparatus, comprising:
   gain control means for controlling a gain of an amplifier circuit which amplifies a reproduction signal in accordance with amplitudes of the reproduction signal from an optical recording medium having first recording units and second recording units; and
   power control means for controlling a reproduction power of a light beam in accordance with the amplitude,
   wherein the power control means controls the reproduction power for each of the first recording units, and the gain control means controls the gain for each of the second recording units at least during a period when the power control means controls the reproduction power, the second recording unit being greater than the first recording unit.

4. The optical reproduction apparatus as set forth in claim 3, further comprising switch means for switching so that the gain by the gain control means is controlled for each recording unit that is smaller than the second recording unit.

5. The optical reproduction apparatus as set forth in claim 3, wherein the power control means controls the reproduction power in accordance with an average of amplitudes of the reproduction signal from a specified mark pattern in the first recording unit, and the gain control means controls the gain in accordance with an average of amplitudes of the reproduction signal from a specified mark pattern in the second recording unit.

6. The optical reproduction apparatus as set forth in claim 4, wherein the power control means controls the reproduction power in accordance with an average of amplitudes of the reproduction signal from a specified mark pattern in the first recording unit, and the gain control means controls the gain in accordance with an average of amplitudes of the reproduction signal from a specified mark pattern in the second recording unit.

7. The optical reproduction apparatus as set forth in claim 5, wherein:
   the recording medium is an optical recording medium of super-resolution type that generates in a reproduction layer an aperture which is smaller than a diameter of a light beam spot so as to reproduce recorded information from a recording layer,
   the power control means controls the reproduction power in accordance with an average of the amplitudes of the reproduction signal from the specified mark pattern composed of a long mark pattern and a short mark pattern, and the gain control means controls the gain in accordance with an average of the amplitudes that have been detected from the reproduction signal of the long mark pattern.

8. The optical reproduction apparatus as set forth in claim 6, wherein:
   the recording medium is an optical recording medium of super-resolution type that generates in a reproduction layer an aperture which is smaller than a diameter of a light beam spot so as to reproduce recorded information from a recording layer,
   the power control means controls the reproduction power in accordance with an average of the amplitudes of the reproduction signal from the specified mark pattern composed of a long mark pattern and a short mark pattern, and the gain control means controls the gain in accordance with an average of the amplitudes that have been detected from the reproduction signal of the long mark pattern.

9. The optical reproduction apparatus as set forth in claim 5, wherein the gain control means includes judgment means for ensuring to average the amplitudes that excludes amplitudes that are abnormal among the amplitudes of the reproduction signal.

10. The optical reproduction apparatus as set forth in claim 6, wherein the gain control means includes judgment means for ensuring to average the amplitudes that excludes amplitudes that are abnormal among the amplitudes of the reproduction signal.

11. The optical reproduction apparatus as set forth in claim 7, wherein the gain control means includes judgment means for ensuring to average the amplitudes that excludes amplitudes that are abnormal among the amplitudes of the reproduction signal.

12. The optical reproduction apparatus as set forth in claim 8, wherein the gain control means includes judgment means for ensuring to average the amplitudes that excludes amplitudes that are abnormal among the amplitudes of the reproduction signal.

13. The optical reproduction apparatus as set forth in claim 3, wherein the first recording unit is composed of one or more sectors, and the second recording unit is composed of a cluster that is constituted by a plurality of sectors and is a minimum recording unit during recording and reproduction.

14. The optical reproduction apparatus as set forth in claim 4, wherein the first recording unit is composed of one or more sectors, and the second recording unit is composed of a cluster that is constituted by a plurality of sectors and is a minimum recording unit during recording and reproduction.

15. The optical reproduction apparatus as set forth in claim 5, wherein the first recording unit is composed of one or more sectors, and the second recording unit is composed of a cluster that is constituted by a plurality of sectors and is a minimum recording unit during recording and reproduction.

16. The optical reproduction apparatus as set forth in claim 6, wherein the first recording unit is composed of one or more sectors, and the second recording unit is composed of a cluster that is constituted by a plurality of sectors and is a minimum recording unit during recording and reproduction.

17. The optical reproduction apparatus as set forth in claim 7, wherein the first recording unit is composed of one or more sectors, and the second recording unit is composed of a cluster that is constituted by a plurality of sectors and is a minimum recording unit during recording and reproduction.

18. The optical reproduction apparatus as set forth in claim 8, wherein the first recording unit is composed of one or more sectors, and the second recording unit is composed of a cluster that is constituted by a plurality of sectors and is a minimum recording unit during recording and reproduction.

19. The optical reproduction apparatus as set forth in claim 9, wherein the first recording unit is composed of one or more sectors, and the second recording unit is composed of a cluster that is constituted by a plurality of sectors and is a minimum recording unit during recording and reproduction.

20. The optical reproduction apparatus as set forth in claim 10, wherein the first recording unit is composed of one or more sectors, and the second recording unit is composed of a cluster that is constituted by a plurality of sectors and is a minimum recording unit during recording and reproduction.

21. The optical reproduction apparatus as set forth in claim 11, wherein the first recording unit is composed of one or more sectors, and the second recording unit is composed of a cluster that is constituted by a plurality of sectors and is a minimum recording unit during recording and reproduction.

22. The optical reproduction apparatus as set forth in claim 12, wherein the first recording unit is composed of one or more sectors, and the second recording unit is composed of a cluster that is constituted by a plurality of sectors and is a minimum recording unit during recording and reproduction.

23. The optical reproduction apparatus as set forth in claim 5, further comprising:

amplitude detection means for detecting the amplitudes of the reproduction signal; and amplitude average means for calculating the average of the amplitudes in accordance with the amplitudes thus detected, wherein the power control means controls the reproduction power in accordance with the average of the amplitudes, and the gain control means controls the gain in accordance with the average of the amplitudes.

24. The optical reproduction apparatus as set forth in claim 6, further comprising:

amplitude detection means for detecting the amplitudes of the reproduction signal; and amplitude average means for calculating the average of the amplitudes in accordance with the amplitudes thus detected, wherein the power control means controls the reproduction power in accordance with the average of the amplitudes, and the gain control means controls the gain in accordance with the average of the amplitudes.

25. The optical reproduction apparatus as set forth in claim 23, wherein the amplitude average means includes:

amplitude range judgment means for judging whether or not the amplitudes detected by the amplitude detection means fall within a predetermined range;

total calculation means for adding only the amplitudes judged, by the amplitude range judgment means, that the amplitudes fall within the predetermined range;

counting means for counting a number of the amplitudes that have been sent to the total calculation means for each minimum recording unit; and division means for dividing a total sum of the amplitudes by the number of the amplitudes counted by the total calculation means so as to calculate the average of the amplitudes and output the average to the gain control means.

26. The optical reproduction apparatus as set forth in claim 24, wherein the amplitude average means includes:

amplitude range judgment means for judging whether or not the amplitudes detected by the amplitude detection means fall within a predetermined range;

total calculation means for adding only the amplitudes judged, by the amplitude range judgment means, that the amplitudes fall within the predetermined range;

counting means for counting a number of the amplitudes that have been sent to the total calculation means for each minimum recording unit; and division means for dividing a total sum of the amplitudes by the number of the amplitudes counted by the total calculation means so as to calculate the average of the amplitudes and output the average to the gain control means.

* * * * *